United States Patent
Ortmann et al.

(10) Patent No.: US 10,094,036 B2
(45) Date of Patent: Oct. 9, 2018

(54) METHOD FOR PRODUCING A MOTOR VEHICLE BODY IN A HYBRID DESIGN

(71) Applicant: Dr. Ing. h. c. F. Porsche Aktiengesellschaft, Stuttgart (DE)

(72) Inventors: Sebastian Ortmann, Stuttgart (DE); Holger Hahlweg, Calw (DE); Thomas Christiansen, Wimsheim (DE); Julian Schoepfer, Stuttgart (DE); Jan Niklas Prange, Sindelfingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 341 days.

(21) Appl. No.: 15/005,033

(22) Filed: Jan. 25, 2016

(65) Prior Publication Data
US 2016/0214666 A1   Jul. 28, 2016

(30) Foreign Application Priority Data
Jan. 23, 2015   (DE) .................. 10 2015 100 968

(51) Int. Cl.
*B62D 25/00*   (2006.01)
*C25D 11/00*   (2006.01)
*B62D 25/20*   (2006.01)
*B62D 29/00*   (2006.01)

(52) U.S. Cl.
CPC .............. *C25D 11/00* (2013.01); *B62D 25/00* (2013.01); *B62D 25/2009* (2013.01); *B62D 29/005* (2013.01)

(58) Field of Classification Search
CPC .............. Y10T 29/49622; B62D 23/00; B62D 23/005; B62D 25/20; B62D 25/2009; B62D 29/001; B62D 29/005; B62D 29/04; B62D 29/041; B62D 29/046; B62D 29/048

See application file for complete search history.

(56) References Cited

U.S. PATENT DOCUMENTS

| | | | | |
|---|---|---|---|---|
| 4,438,971 A | * | 3/1984 | Zaydel | B62D 27/02 296/187.01 |
| 5,575,526 A | * | 11/1996 | Wycech | B29C 44/1228 180/68.4 |
| 6,073,991 A | * | 6/2000 | Naert | B60G 7/001 296/187.02 |

(Continued)

FOREIGN PATENT DOCUMENTS

| | | |
|---|---|---|
| DE | 43 30 559 | 3/1995 |
| DE | 199 44 483 | 3/2001 |

(Continued)

OTHER PUBLICATIONS

WO 2011128081—English Translation.*
German Search Report dated Oct. 2, 1015.

*Primary Examiner* — Jason L Vaughan
(74) *Attorney, Agent, or Firm* — Gerald E. Hespos; Michael J. Porco; Matthew T. Hespos

(57) ABSTRACT

A method is provided for producing a motor vehicle body in a hybrid design. The motor vehicle body (2) has a bodyshell structure (1) and a floor module (4). The bodyshell structure (1) has a structure frame (3), and the floor module (4) is a fiber composite component. The method includes passing the structure frame (3) through a CDC process before connecting the floor module (4) to the structure frame (3).

13 Claims, 6 Drawing Sheets

(56) References Cited

U.S. PATENT DOCUMENTS

| | | | |
|---|---|---|---|
| 6,276,477 B1* | 8/2001 | Ida | B62D 21/07 |
| | | | 180/89.1 |
| 6,296,301 B1* | 10/2001 | Schroeder | B62D 29/046 |
| | | | 296/187.02 |
| 6,854,791 B1 | 2/2005 | Jaggi | |
| 6,887,526 B1 | 5/2005 | Arlt et al. | |
| 7,823,939 B2* | 11/2010 | Handing | B60R 19/34 |
| | | | 188/374 |
| 8,449,024 B2* | 5/2013 | Pietroni | B62D 29/046 |
| | | | 296/204 |
| 8,815,021 B2 | 8/2014 | Brouwer | |
| 8,956,469 B2* | 2/2015 | Fuetterer | C23C 10/02 |
| | | | 148/240 |
| 8,998,296 B2* | 4/2015 | Eipper | B62D 21/09 |
| | | | 296/187.01 |
| 9,056,633 B2* | 6/2015 | Lohmann | B62D 25/025 |
| 9,132,859 B2* | 9/2015 | Yamaji | B62D 25/00 |
| 9,394,009 B2* | 7/2016 | Jaschke | B62D 29/002 |
| 2003/0017754 A1 | 1/2003 | Suss | |
| 2009/0295195 A1 | 12/2009 | Pietroni | |
| 2012/0270060 A1* | 10/2012 | Wibbeke | B21D 22/208 |
| | | | 428/594 |
| 2013/0076069 A1 | 3/2013 | Fuchs et al. | |
| 2013/0249242 A1 | 9/2013 | Kimoto et al. | |

FOREIGN PATENT DOCUMENTS

| | | |
|---|---|---|
| DE | 101 64 765 | 6/2004 |
| DE | 60 2005 588 | 10/2008 |
| DE | 10 2010 003 571 | 10/2011 |
| DE | 10 2010 014 574 | 10/2011 |
| DE | 10 2010 030 295 | 12/2011 |
| DE | 10 2010 037 963 | 4/2012 |
| DE | 10 2010 053 877 | 6/2012 |
| EP | 0 934 190 | 12/2003 |
| EP | 1 224 111 | 1/2004 |
| EP | 2 615 013 | 7/2013 |
| JP | 06040353 A | 2/1994 |
| JP | 06056053 A | 3/1994 |
| JP | 2014031461 A | 5/2014 |

* cited by examiner

METHOD FOR PRODUCING A MOTOR VEHICLE BODY IN A HYBRID DESIGN

CROSS REFERENCE TO RELATED APPLICATION

This application claims priority under 35 USC 119 to German Patent Appl. No. 10 2015 100 968.4 filed on Jan. 23, 2015, the entire disclosure of which is incorporated herein by reference.

BACKGROUND

1. Field of the Invention

The invention relates to a method for producing a motor vehicle body in a hybrid design.

2. Description of the Related Art

Motor vehicle bodies composed of carbon fiber reinforced plastic (CFRP) in a metal hybrid design are known. A hybrid design is understood as meaning the use of different materials for different body components. For example magnesium may be used to realize a lightweight body in addition to various metals.

A "monocoque" may be produced from a fiber composite material. The monocoque is a vehicle cell of the motor vehicle body and may include front and rear walls, a floor accommodated between the front and rear walls, a tunnel incorporated into the floor and extending in the longitudinal direction of the motor vehicle body, and sills formed on the floor in the longitudinal direction. A monocoque of a closed motor vehicle body additionally has pillars and a roof.

EP 2 615 013 A1 discloses a monocoque formed from a fiber reinforced resin for a motor vehicle body. The disclosed monocoque is an essential constituent part of a bodyshell structure. The monocoque comprises a structure frame and a floor module of the bodyshell structure.

DE 10 2010 037 963 A1 describes a motor vehicle body with a monocoque produced from a thermoplastic. The material can be processed by injection molding and therefore can be used in series production.

DE 10 2010 014 574 B4 discloses a bodyshell structure of a motor vehicle body with a floor component produced as a fiber composite component. The floor component comprises a floor module and sills formed in the longitudinal direction.

DE 60 2005 003 588 T2, DE 101 64 675 A1 and EP 1 224 111 B show other bodyshell structures that have a floor module composed of carbon fiber reinforced plastic.

It is an object of the invention to specify a cost effective method for producing a motor vehicle body in a hybrid design.

SUMMARY

The invention relates to a method for producing a motor vehicle body in a hybrid design. The motor vehicle body has a bodyshell structure with a structure frame and a floor module in the form of a fiber composite component. The floor module is connected to the structure frame after the structure frame has passed through a cathodic dip coating (CDC) process.

The connection of a fiber composite component to a metallic component is fundamentally problematic since corrosion may occur here because of the tendency of the fiber composite component to corrode. Under certain circumstances, fiber composite materials have very good corrosion resistance. They become susceptible only in contact with other materials if the fiber composite material is reinforced with carbon fibers. Electrochemical corrosion may occur as contact corrosion or crevice corrosion. A layer may be formed on the metallic component by the CDC process, and additional insulation layers could be applied to the bodyshell structure prior to the connection of the bodyshell structure to the floor module so that the floor module is resistant to corrosion even when a carbon fiber reinforced material is used.

High temperatures that occur during a production or coating process of metals also are problematic. For example, a fiber composite component and a metallic component may have different coefficients of thermal expansion, and different thermal expansions may arise in the production or coating process when a fiber composite component is connected to the metallic component. Furthermore, heat may lead to changes in rigidity of a matrix of the fiber composite component.

Accordingly, the metallic structure frame of the bodyshell structure preferably passes through a CDC (cathodic dip coating) process prior to connection to the floor module produced from a fiber composite material, and is connected subsequently thereto. Thus, the risk of the change in the rigidity of the floor module and the risk of the different thermal expansions, with a consequence of crevices or cracks, can thus be avoided.

The method of the invention may include introducing the floor module into the bodyshell structure from a lower side of the bodyshell structure. The floor module and/or the bodyshell structure may be moved along a joining axis. The structure frame of the bodyshell structure may have further essential elements of the motor vehicle body, such as roof, wings, doors, etc., which, in the mounted state, have passed through the CDC process together. Thus, the bodyshell structure no longer has to be disassembled since the floor module can be fit at a location from the lower side.

The floor module may have a circumferential surface that is formed over a complete circumference of an inner surface of the floor module. The circumferential surface is connected to a joining surface of the bodyshell structure that may be closed circumferentially. As a result, there is the possibility of achieving a closed overlapping region between the bodyshell structure and the floor module. The overlapping region implements a protected sealing in relation to penetrating moisture.

The floor module may receive the bodyshell structure in a supporting manner. Thus, the floor module can be fit into the bodyshell structure from the lower side in a simple manner, and overlapping of the floor module on the lower side is achieved to provide further protected sealing. For the simplified fitting from the lower side, floor circumferential surfaces of the circumferential surface that are formed on a floor element of the floor module receive the bodyshell structure in a supporting manner, and/or rear circumferential surfaces of the circumferential surface that are formed on a rear wall of the floor module receive the bodyshell structure in a partially supporting manner.

The floor module may have an interior space that can be introduced into the bodyshell structure in such a manner that the floor module seals the bodyshell structure in the region of the joining surface of the bodyshell structure in relation to an exterior space formed facing away from the interior space of the floor module.

The method may have an integrally bonded connection of the floor module to the bodyshell structure to provide a simple connection between the bodyshell structure and the floor module can be achieved. The integrally bonded connection may be an adhesive connection that provides additional sealing in relation to moisture.

A force-fitting and/or form-fitting connection between the floor module and the bodyshell structure achieves an additionally protected connection.

The method of the invention has improved compensation for tolerances by individual compensation if the floor module is of multi-part design prior to the connection of the floor module to the bodyshell structure. According to the invention, individual parts of the floor module initially are joined loosely to form a floor module model prior to connection to the bodyshell structure. The floor module model then is inserted into the bodyshell structure and, during insertion, the individual parts are aligned in relation to one another for fitting into the bodyshell structure. The individual parts then are connected to the bodyshell structure, and further are connected to one another in an integrally bonded and/or form-fitting and/or force-fitting manner.

As an alternative to the abovementioned method, the individual parts of the floor module which is of multi-part design prior to the connection to the bodyshell structure are connected to the bodyshell structure individually and independently of one another. The parts that have been connected individually to the bodyshell structure then are connected to one another in an integrally bonded and/or form-fitting and/or force-fitting manner. For example, the rear wall may be joined into the bodyshell structure and subsequently may be connected to the bodyshell structure in an integrally bonded and/or form-fitting and/or force-fitting manner. The floor element then may be joined into the bodyshell structure and subsequently may be connected to the bodyshell structure in an integrally bonded and/or form-fitting and/or force-fitting manner. The end wall then may be joined into the bodyshell structure and subsequently may be connected to the bodyshell structure in an integrally bonded and/or form-fitting and/or force-fitting manner. Finally, the individual parts are connected to one another in an integrally bonded and/or form-fitting and/or force-fitting manner.

The individual parts may be introduced into the bodyshell structure from the lower side of the bodyshell structure, and the individual parts and/or the bodyshell structure may be moved along a joining axis.

Further advantages, features and details of the invention emerge from the description below of preferred exemplary embodiments and with reference to the drawings. The features and combinations of features mentioned above in the description and the features and combinations of features mentioned below in the description of the figures and/or solely shown in the figures are usable not only in the respectively indicated combination, but also in other combinations or by themselves without departing from the scope of the invention. Identical or functionally identical elements are assigned identical reference signs. For clarity reasons, the elements may not be provided with their reference sign in all of the figures, but without the assignment thereof being lost.

DETAILED DESCRIPTION

Figure 1:
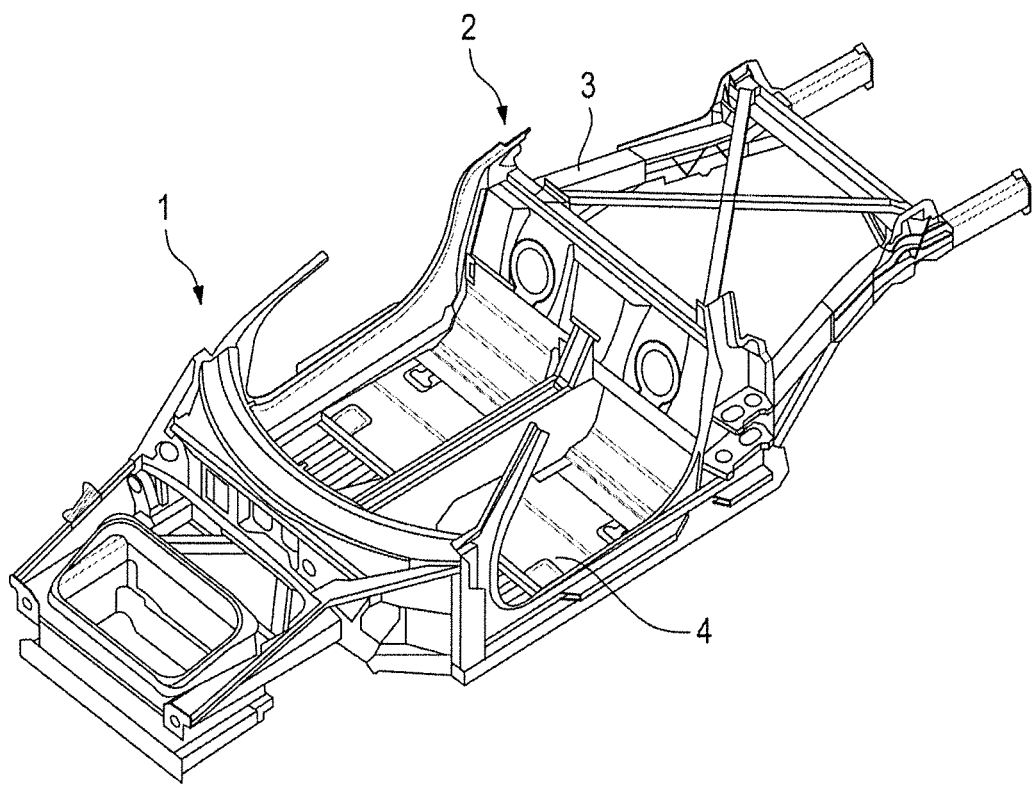
FIG. 1 shows, in a perspective view, a bodyshell structure with a floor module of a motor vehicle body according to the prior art.
Figure 2:
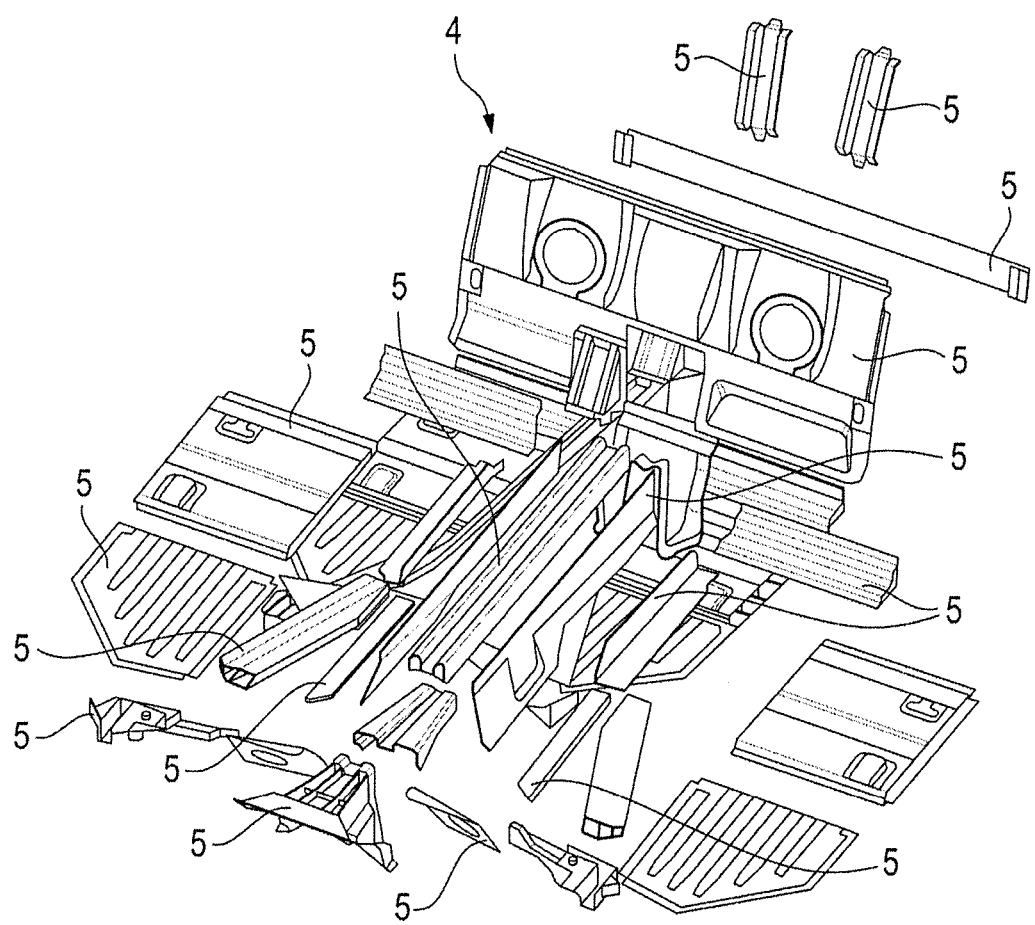
FIG. 2 is an exploded perspective view of the floor module of FIG. 1.

A prior art hybrid bodyshell structure 1 of a motor vehicle body 2 is illustrated in FIG. 1. The prior art hybrid bodyshell structure 1 has a structure frame 3 and a floor module 4. The prior art floor module 4 is assembled from numerous individual components 5, as illustrated in FIG. 2. These individual components are produced in different production processes, for example by extrusion or casting, or in the form of sheet metal.

Figure 3:
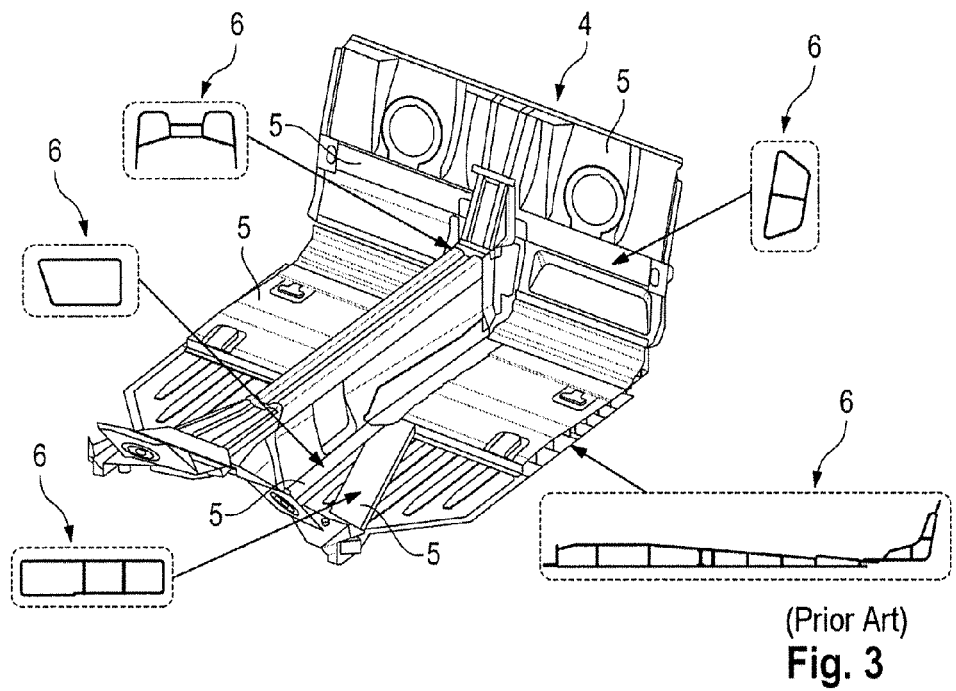
FIG. 3 is a perspective view, partly in section, of the floor module of FIG. 1.

FIG. 3 shows the floor module 4 according to the prior art in the assembled state. Furthermore, cross sections 6 of various individual components 5 are illustrated. The different cross sections 6 of the individual components 5 are adapted to the correspondingly used material and shape of the individual component, and are required for strength reasons. Therefore the floor module 4 can be produced in a lightweight design and at the same time has a high degree of strength and rigidity. The numerous individual components 5 are required because of these different cross sections 6, and therefore high costs are incurred because of the high joining expense that is required to assemble the numerous individual components 5 to form a module.

Figure 4:
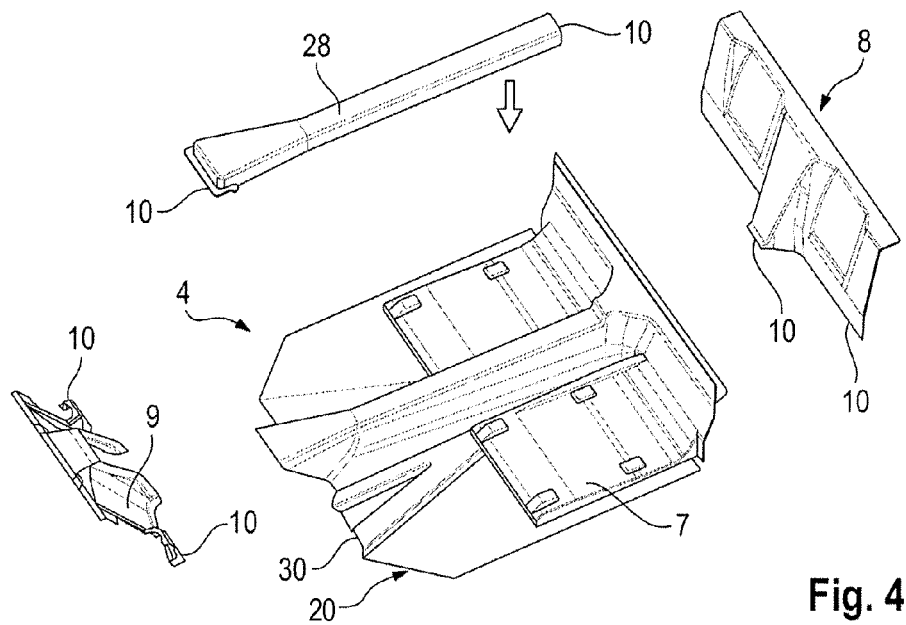
FIG. 4 is an exploded perspective view of a floor module produced as a fiber composite component.

A further weight reduction of the motor vehicle body 2 can be achieved by producing the floor module 4 as a fiber composite part, as illustrated in FIG. 4. The floor module 4 illustrated in FIG. 4 is assembled from a floor element 7, a rear wall 8, a front wall 9 and a tunnel shell 28 that are bonded adhesively to one another at joining points 10 that face one another. The complete floor module 4 is formed after the joining operation.

The floor element 7, the rear wall 8, the end wall 9 and the tunnel shell 28 are of relatively flat and compact design, as compared to the floor module 4.

The advantage of this production process of the floor module 4 is that the dies and machines necessary for producing the fiber composite components have smaller dimensions than machines and dies for producing the floor module 4 as a single piece.

The floor module 4 may also be formed only from the floor element 7, the rear wall 8 and the end wall 9. However, a core which is customarily produced from foam then remains in the tunnel to model the tunnel. This leads to increased rigidity and to an increased weight. The advantage in this connection resides in the use of only one tool for producing the floor element 7 and fewer process steps.

The floor module 4 is produced from the four elements by initially placing: floor element 7, rear wall 8, end wall 9 and tunnel shell 28, preferably, first of all, the tunnel shell 28 on the floor element 7 and then connecting these two components. The rear wall 8 then is placed onto the floor element 7 followed by the end wall 9.

The joining points 10 are positioned so that, at the end of joining the elements 7, 8, 9, 28 together, cavities (not illustrated specifically) and/or channels 30 of the elements 7, 8, 9, 28 that are formed on the respective edges of the elements 7, 8, 9, 28, are closed. The operation to join the tunnel shell 28 is omitted if the vehicle does not require a tunnel shell 28.

Figure 5:
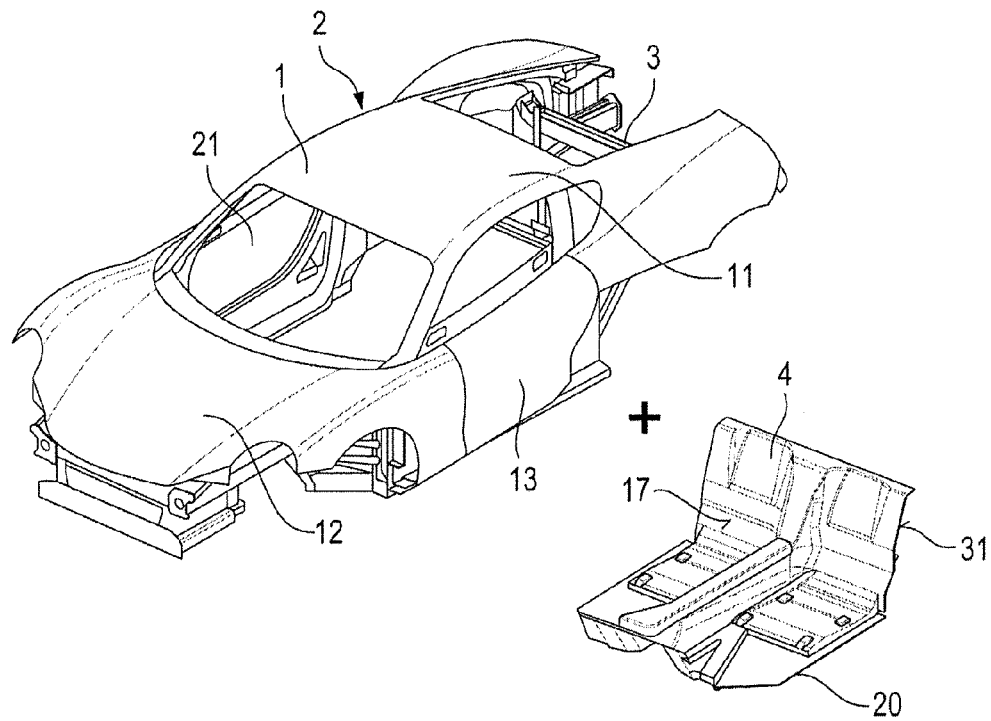
FIG. 5 is an exploded perspective view of an extended bodyshell structure of a motor vehicle body.
Figure 6:
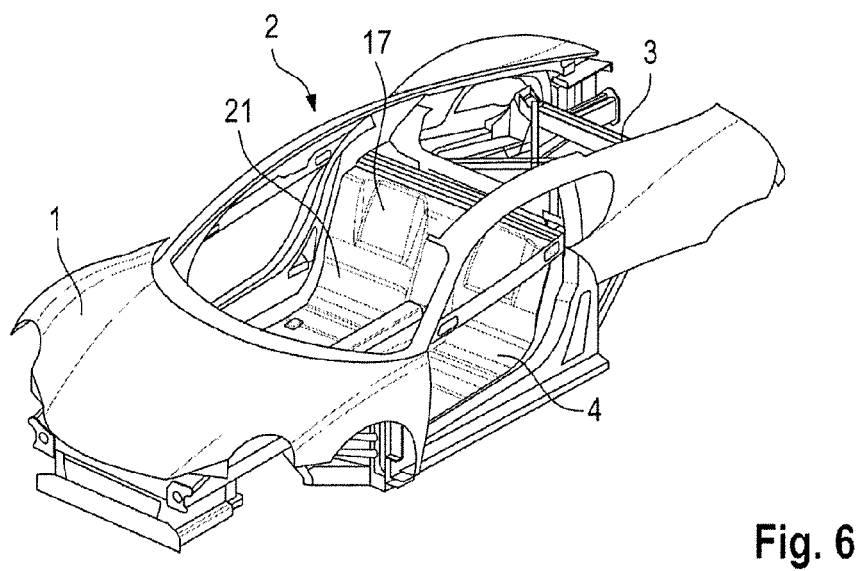
FIG. 6 is a perspective view of the extended bodyshell structure in the assembly.

FIG. 5 illustrates a bodyshell structure 1 with a floor module 4 in a partial exploded illustration. The bodyshell structure 1 also has a roof 11, a front hood 12 and doors 13. In FIG. 6, the floor module 4 is connected to the structure frame 3, but the roof 11 is not illustrated here for clarity reasons.

The method for producing the motor vehicle body 2 includes coating and/or painting the primarily metallic body assemblies 1, 11, 12, 13 individually or together by a CDC method (cathodic dip coating) and then connecting these coated and/or painted components to the floor module 4 that is produced primarily from carbon fiber reinforced plastic. It is obvious that the bodyshell structure 1 may comprise other body assemblies or components in addition to the illustrated body assemblies 11, 12, 13 before the bodyshell structure is connected to the floor module 4.

Figure 7:
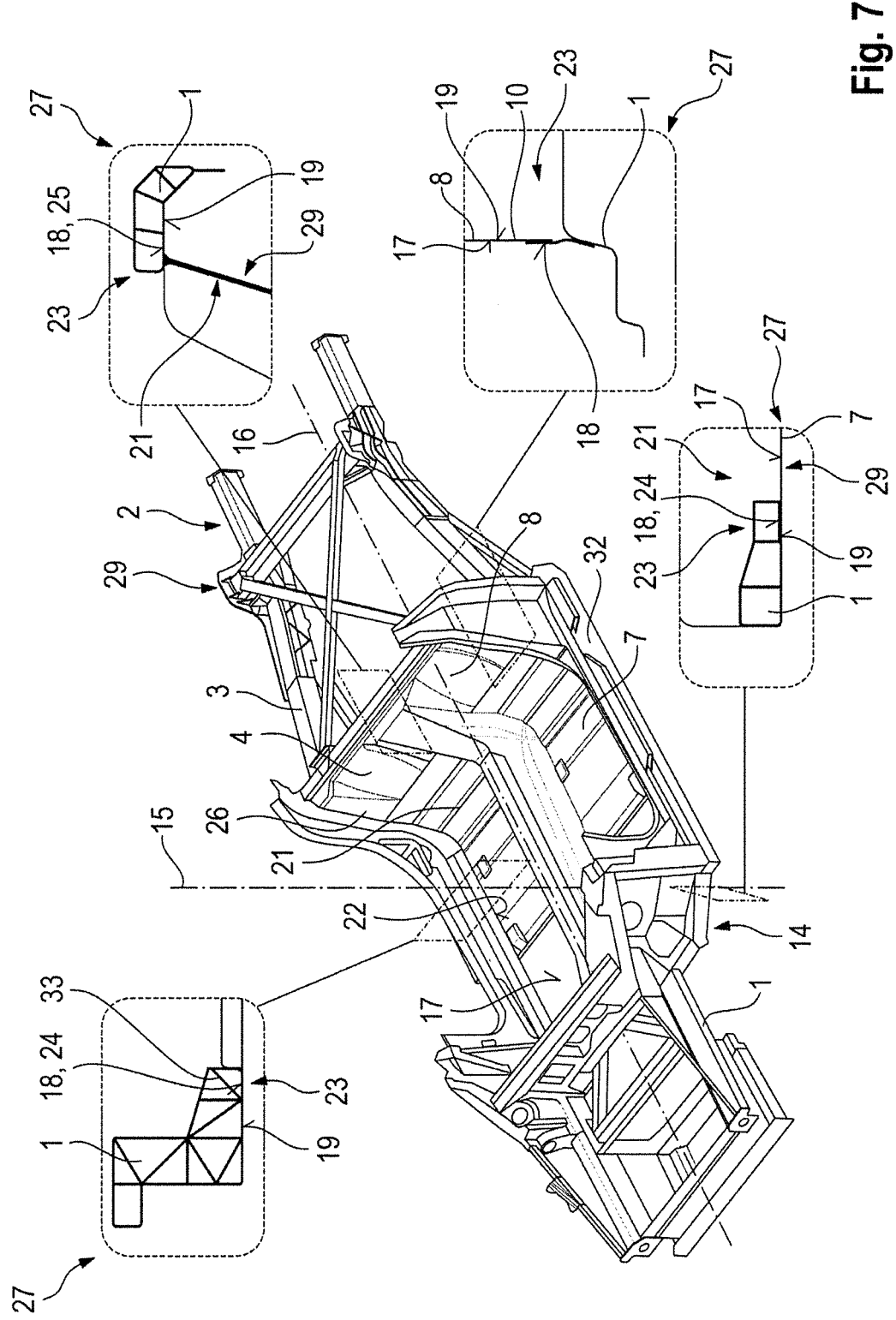
FIG. 7 is a perspective illustration of the bodyshell structure of FIG. 1 with a floor module according to FIG. 4 illustrating various joining regions.

The method includes introducing the floor module 4 into the structure frame 3 of the bodyshell structure 1 from a lower side 14 of the bodyshell structure 1 and along a joining axis 15, as shown in FIG. 7. The movement ends when the floor module 4 and the bodyshell structure 1 are positioned so as to be connectable to one another at correspondingly provided contact points and/or contact surfaces in an integrally bonded and/or force-fitting and/or form-fitting manner.

In the illustrated example, the joining axis 15 is perpendicular to a body longitudinal axis 16 of the motor vehicle body 2. The bodyshell structure 1 also could be moved along the joining axis 15, or the two parts, bodyshell structure 1 and floor module 4, could be moved along the joining axis 15.

An inner surface 17 of the floor module 4 has a circumferential contact surface 18 that is connected to a joining surface 19 of the bodyshell structure 1. The circumferential surface 18 is formed completely over a circumference 20 of the floor module 4 to seal an interior space 21 of the floor module 4 that corresponds to an interior space of the motor vehicle body 2. The inner surface 17 faces the interior space 21, and an outer surface 31 of the floor module 4 faces away from the inner surface 17 and toward an exterior space 29.

The joining surface 19 also is formed completely over an inner circumference 22 of the structure frame 3, and the extent of the inner circumference 22 is formed in a complementary manner with respect to the circumference 20. An overlapping region 23 is therefore formed between the structure frame 3 and the floor module 4 and is closed over the circumference 20 to provide sealing of the interior space 21.

The floor module 4 receives the bodyshell structure 1 in a supporting manner. The supporting reception is present on partial surfaces of the circumferential surface 18 and joining surface 19. These partial surfaces are perpendicular to a roadway plane (not illustrated specifically). In the illustrated embodiment, floor circumferential surfaces 24 that are formed on the floor element 7, and rear circumferential surfaces 25 that are formed on the rear wall 8 and that face away from the floor element 7 receive the bodyshell structure 1 in a supporting manner.

The circumferential surface 18 and joining surface 19 are formed opposite each other. The circumferential surface 18 and the joining surface 19 are flat so that a contact between the circumferential surface 18 and the joining surface 19 can be produced completely over the circumference 20 to ensure sealing.

The floor module 4 may be connected to the bodyshell structure 1 in an integrally bonded manner. Thus a further method step can be followed by a force-fitting and form-fitting connection, for example by screws, between the bodyshell structure 1 and the floor module 4 in the joining or overlapping region 23. The floor module 4 could also be connected to the bodyshell structure 1 only in a force-fitting and form-fitting manner. Provision of a sealing element (not illustrated specifically) in the overlapping region 23 would then be advantageous for protecting the sealing.

The floor module 4 is produced from a carbon fiber reinforced plastic and forms a "monocoque" together with part of the structure frame 3.

The floor module 4 can consist of the floor element 7, the rear wall 8 and the end wall 9 prior to the connection to the bodyshell structure 1. The floor module 4 may also have the tunnel shell 28 fastened to the floor element 7. In a first step, the floor element 7, the rear wall 8 and the end wall 9 are joined together loosely so as to be movable in relation to one another to form a floor module model, and therefore a circumferential contour 26 of the circumference 20 is produced. The circumferential contour 26 is changeable in the direction of the three Cartesian coordinates. In a second step, the floor module model is inserted into the bodyshell structure 1. During the insertion, the elements 7, 8, 9 are aligned in relation to one another for the fitting of the floor module 4 into the bodyshell structure 1. In a third step, the elements 7, 8, 9 are connected to the bodyshell structure 1 in an integrally bonded manner. In a fourth step, the elements 7, 8, 9 are connected with an adhesive suitable for the carbon fiber reinforced plastic from which the elements 7, 8, 9 are produced.

A further variant of the method of the invention provides that the elements 7, 8, 9 are connected individually into the bodyshell structure 1. In this case, in a first step, the rear wall 8 is fit in and connected to the bodyshell structure 1 in an integrally bonded manner. In a second step, the floor element 7 is fit in and connected to the bodyshell structure 1 in an integrally bonded manner. In a third step, the end wall 9 is fit in and connected to the bodyshell structure 1 in an integrally bonded manner. In a fourth step, the elements 7, 8, 9 are connected to one another in an integrally bonded manner.

FIG. 7 also illustrates the different sectional drawings 27 in the joining or overlapping region 23 of the bodyshell structure 1 and the floor module 4. In contrast to the monocoques shown in the prior art, sills 32 of the motor vehicle body 2 are formed on the structure frame 3 and therefore pass with the structure frame 3 through the CDC process before the connection to the floor module 4.

The sill has to fulfill two functions. First, the sill has to be sufficiently stiff so that the bodyshell structure 1 can be moved without the floor module 4 through the CDC process and a remaining production line. Second, the floor module 4 produced from the fiber composite material cannot be damaged during the operation of a motor vehicle. Therefore, diagonal struts 33 are introduced into a cross sectional profile of the sill 32 in the region of the overlapping of the circumferential surface 18 and the joining surface 19 of the floor module 4 to provide increased rigidity.

Figure 8:
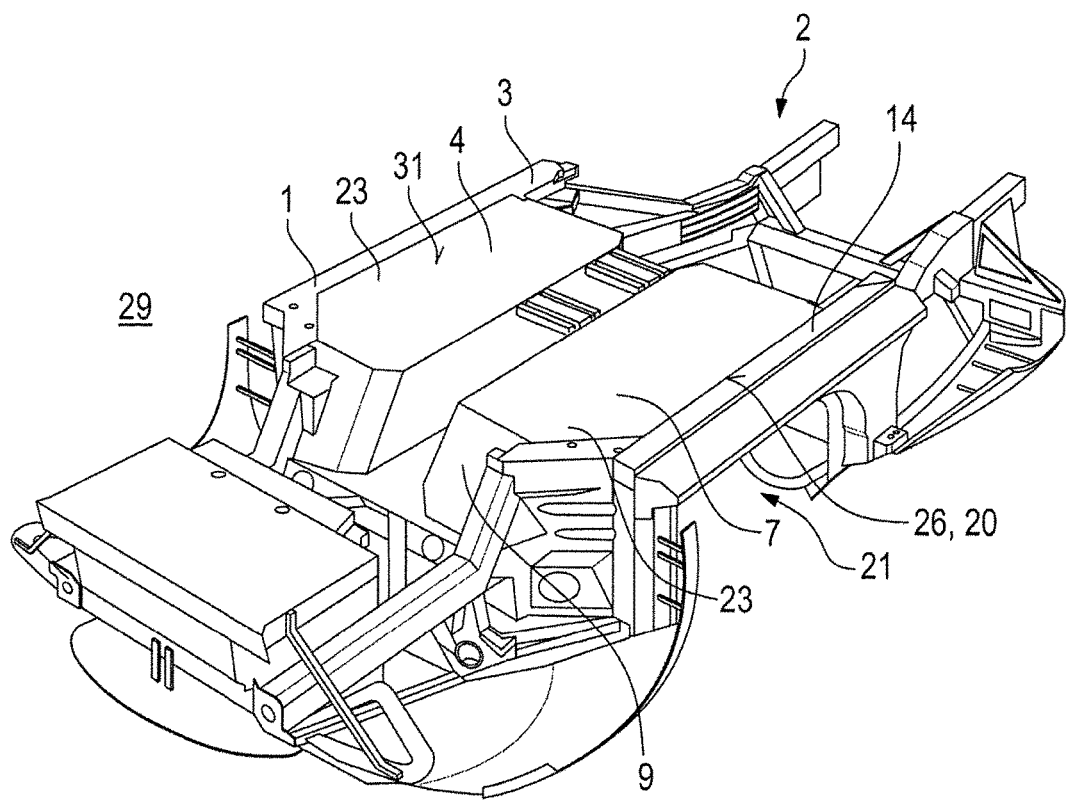
FIG. 8 is a top view of a lower side of the bodyshell structure and the floor module in a further exemplary embodiment.

FIG. 8 is a perspective view of the lower side 14, the bodyshell structure 1 and the floor module 4 in a variant of the method of the invention. FIG. 8 shows that the overlapping region 23 is formed over the complete circumference 20 of the floor module 4, and therefore the interior space 21 is sealed in relation to the exterior space 29.

LIST OF REFERENCE SIGNS 1 bodyshell structure
2 motor vehicle body
3 structure frame
4 floor module
5 individual component
6 cross section
7 floor element
8 rear wall
9 end wall
10 joining point
11 roof
12 front hood
13 door
14 lower side
15 joining axis
16 body longitudinal axis
17 inner surface
18 circumferential surface
19 joining surface
20 circumference
21 interior space
22 inner circumference
23 overlapping region
24 floor circumferential surface
25 rear circumferential surface
26 circumferential contour
27 sectional drawing
28 tunnel shell
29 exterior space
30 cavity
31 outer surface
32 sill
33 diagonal strut

What is claimed is:

1. A method for producing a motor vehicle body in a hybrid design, comprising: providing a bodyshell structure having a structure frame; providing a floor module as a fiber composite component; passing the structure frame through a CDC process; and after the CDC process connecting the floor module to the structure frame.

2. The method of claim 1, wherein the step of connecting the floor module to the structure frame comprises introducing the floor module into the bodyshell structure from a lower side of the bodyshell structure and along a joining axis.

3. The method of claim 1, wherein the floor module has an inner surface that includes a circumferential surface, the method including connecting the circumferential surface of the floor module to a joining surface of the bodyshell structure.

4. The method of claim 3, wherein the floor module receives the bodyshell structure in a supporting manner.

5. The method of claim 3, wherein the circumferential surface includes floor circumferential surfaces and rear circumferential surfaces, the floor circumferential surfaces are formed on a floor element of the floor module, the rear circumferential surfaces are formed on a rear wall of the floor module, the floor circumferential surfaces and the rear circumferential surfaces receive the bodyshell structure in a partially supporting manner.

6. The method of claim 1, wherein the step of connecting the floor module to the structure frame comprises sealing the floor module to the bodyshell structure in the region of a joining surface of the bodyshell structure for sealing an interior space in the bodyshell structure into relation to an exterior space facing away from an interior space.

7. The method of claim 1, wherein the step of connecting the floor module to the structure frame comprises connecting the floor module to the bodyshell structure in an integrally bonded manner.

8. The method of claim 1, wherein the step of connecting the floor module to the structure frame comprises connecting the floor module to the bodyshell structure in a force-fitting and/or form-fitting manner.

9. The method of claim 1, wherein the floor module has plural parts prior to connection of the floor module to the bodyshell structure, and wherein, prior to connection of the parts of the floor module to the bodyshell structure, the method comprises:
loosely joining the parts to form the floor module model;
inserting the floor module model into the bodyshell structure and, during the insertion, aligning the individual parts in relation to one another for fitting into the bodyshell structure;
connecting the individual parts to the bodyshell structure; and
connecting the individual parts to one another in an integrally bonded and/or form-fitting and/or force-fitting manner.

10. The method of claim 1, wherein the floor module has plural parts prior to the step of connecting the floor module to the bodyshell structure, and wherein, prior to connection of the floor module to the bodyshell structure, the method comprises:
joining the parts to form the floor module.

11. The method of claim 1, wherein the floor module has plural parts prior to the step of connecting the floor module to the bodyshell structure, and wherein the method further comprises connecting each of the parts individually to the bodyshell structure independently of one another, and then connecting the individual parts to one another in an integrally bonded and/or form-fitting and/or force-fitting manner.

12. The method of claim 11, further comprising:
joining the rear wall into the bodyshell structure and then connecting the rear wall to the bodyshell structure in an integrally bonded and/or form-fitting and/or force-fitting manner,
joining the floor element into the bodyshell structure and then connecting the floor element to the bodyshell structure then connecting the floor element to the bodyshell structure in an integrally bonded and/or form-fitting and/or force-fitting manner,
joining the end wall into the bodyshell structure and then connecting the end wall to the bodyshell structure in an integrally bonded and/or form-fitting and/or force-fitting manner, and
connecting the rear wall, the floor element and the end wall to one another in an integrally bonded and/or form-fitting and/or force-fitting manner.

13. The method of claim 12, wherein the individual parts are introduced into the bodyshell structure from a lower side of the bodyshell structure, while moving the individual parts and/or the bodyshell structure along a joining axis.

* * * * *